Nov. 29, 1949     G. H. POHM ET AL     2,489,814

ELECTRIC CONTROL CIRCUIT

Filed Aug. 2, 1944

INVENTORS.
GEORGE H. POHM
BY HENRY M. HUGE
ATTORNEYS.

Patented Nov. 29, 1949

2,489,814

UNITED STATES PATENT OFFICE 2,489,814

ELECTRIC CONTROL CIRCUIT

George H. Pohm and Henry M. Huge, Lorain, Ohio, assignors, by mesne assignments, to Lorain Products Corporation, Lorain, Ohio, a corporation of Ohio Application August 2, 1944, Serial No. 547,777

7 Claims. (Cl. 321—25)

This invention relates to electric control circuits and more particularly to control circuits which may be used with a rectifier to supply an increasing voltage to the rectifier as the load on the rectifier increases.

An object of this invention is to produce a control circuit in which the increase of input voltage to the rectifier may be made to accurately compensate for the voltage drop in the rectifier and associated circuits.

Another object of this invention is to utilize the direct current delivered by the rectifier to control the impedance of a control element having a magnetic core.

A still further object of the invention is to provide a control circuit in which the voltage supplied to the rectifier may be independently adjusted at several values of load current.

Still another object of this invention is to utilize a magnetic core construction having a plurality of parallel flux paths of different characteristics for accurately controlling the characteristics of the impedance element.

An additional object of the invention is to utilize a non-linear resistor to control the proportion of load current which is used as controlling current to accurately determine the impedance characteristic of the impedance element.

Other objects and a better understanding of this invention may be obtained by referring to the following specification and claims in connection with the accompanying drawings.

In supplying a direct current load from a rectifier, various voltage drops occur in the circuit, depending upon the load current being supplied. In particular, rectifiers of the dry disc type introduce a variable voltage drop, and when filtered output is required, the filter inductance also introduces a voltage drop. If a constant rectified output voltage is required, it is therefore necessary to increase the alternating voltage supplied to the rectifier with increasing load current. In the prior art, direct-current controlled reactors have been used for this purpose. The present invention deals with a control system capable of supplying precisely regulated input voltage to the rectifier in order to accurately compensate for the voltage drops produced by increasing load. When an ordinary direct-current controlled reactor is controlled by the load current on a rectifier, the reactor changes its impedance rapidly as the load current is first increased but with additional increases in load current, the rate of change of impedance of the reactor diminishes and frequently is no longer rapid enough to compensate for the voltage drops in the circuit. By this invention this difficulty is overcome and a control arrangement is provided in which the rate of change of impedance of the reactor under various load currents may be independently controlled, and consequently this invention makes it possible to supply a substantially constant rectified voltage for wide variations of load.

Figure 1:
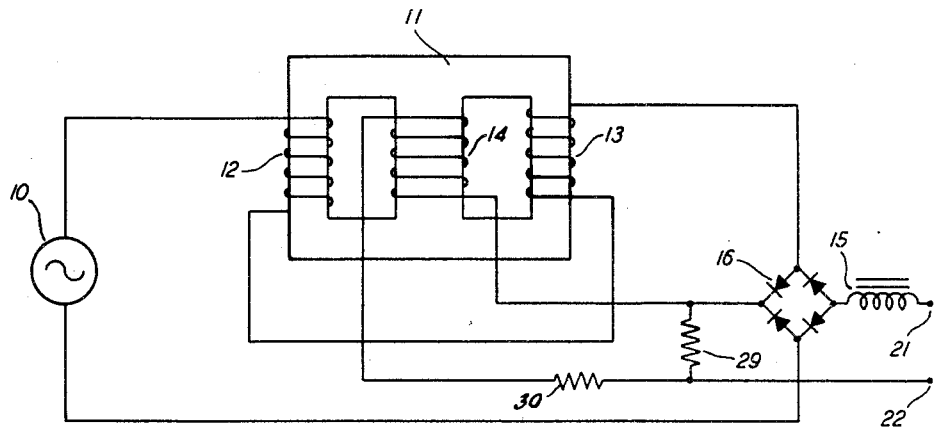
Figure 1 is a circuit diagram of a control circuit in which a direct-current controlled reactor is connected in the supply circuit of a rectifier, and in which a non-linear resistor is used to modify the controlling current.

With more particular reference to Figure 1 there is shown a reactor 11 having alternating current windings 12 and 13 connected in series and inserted between an alternating current source 10 and a full wave rectifier 16. The direct current winding 14 of the reactor 11 is connected in series with one of the direct current leads of the rectifier 16 so that part of the load current delivered by the rectifier to the terminals 21 and 22 flows through the saturating winding 14 of the reactor 11. The resistor 29 in parallel with the direct-current winding 14 also carries a portion of the load current delivered by the rectifiers. The proportion of load current which flows through the winding 14 depends on the relative resistances of the winding 14 and the resistor 29 and on resistor 30.

When there is no load connected to the terminals 21 and 22, the reactor 11 is in an unbiased condition and has a very high impedance. This impedance may be so high that the leakage current of the rectifier 16 is sufficient to introduce a considerable voltage drop in the rectifier supply, or a shunting impedance may be provided in parallel with the rectifier input to provide an initial voltage drop. As load is applied to the output terminals 21 and 22, the direct current flowing through direct-current winding 14 magnetizes the core and reduces the impedance of the alternating current windings 12 and 13 of the reactor 11. This change in impedance may be made rapid enough so that the voltage supplied to the rectifiers increases with increasing load. In order to maintain a constant rectified output voltage, the increase in input voltage to the rectifiers must keep pace with the increase in voltage drop in the rectifiers, in the filter inductance 15, and in the network comprising direct current winding 14, resistor 30 and resistor 29. With low flux density in the core of the reactor 11, this condition is readily met, but as the flux density increases with increasing load, the rate of change of impedance of the windings 12 and 13 tends to decrease below the required rate. The non-linear resistor 29 is used to increase the rate of change of impedance of windings 12 and 13 at heavy loads. The resistor has a positive resistance characteristic so that with increasing load current, its resistance increases. This change in resistance results in a larger proportion of the load current being forced through winding 14 under heavy loads than under light loads. By the provision of a resistor 29 having the required non-linearity, it is possible to control the rate of change of impedance of the reactor 11 with respect to load changes for heavy load currents. This control is in addition to that available for light loads, which is determined by the number of turns on winding 14, so that it is possible to independently adjust the rate of change of impedance of the reactor 11 under light and heavy load load currents and therefore it can accurately compensate for voltage drops in the circuit under both conditions.

This principle may be elaborated by the addition of other resistors, either linear or non-linear such as resistor 30, to increase the flexibility of control in order to provide accurate adjustment of the output voltage for more load conditions. For example, a non-linear resistor 30 having a negative resistance curve connected in series with winding 14 reduces the resistance of its circuit under heavy load current to increase the effectiveness of non-linear resistor 29 and to cause an even greater proportion of the load current to traverse the winding 14 under heavy loads. Each additional non-linear resistor provides an additional adjustment but also introduces a slight additional loss. It may therefore be preferable to omit resistor 30 in many instances.

Figure 2:
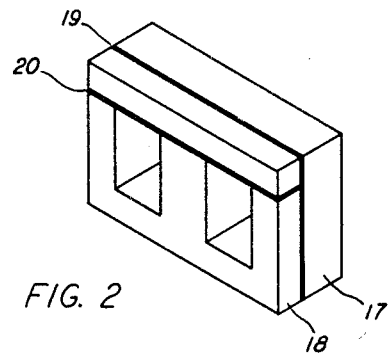
Figure 2 is a drawing showing a preferred core construction for the reactor of Figure 1 which may be used without the non-linear resistor shown in Figure 1.

By providing the reactor 11 shown in Figure 1 with a special core structure such as that shown in Figure 2, it is possible to control the rate of change of impedance of the reactor under heavy load current as well as under light load current without the use of the non-linear resistor 29, although the non-linear resistor may be used in connection with the special core structure.

Figure 2 shows a magnetic core upon which the windings 12, 13 and 14 of Figure 1 may be wound. The core structure consists of two sections 17 and 18 which are separated by a non-magnetic spacer 19 in order to minimize the interchange of flux between the two sections. The core section 17 may be made up of interleaved laminations to produce a substantially closed magnetic circuit, while the core section 18 is provided with a small non-magnetic gap 20 in its magnetic circuit. The two sections 17 and 18 of the core comprise parallel magnetic flux paths and the impedance of the windings wound upon them depends upon the characteristics of both the flux paths. The core structure as shown makes it possible to obtain the required change in impedance by the saturation of the core section 17 under low magnetizing forces and then by the saturation of the core section 18 under higher magnetizing forces. The non-magnetic gap 20 in section 18 tends to keep its flux density lower than that of section 17 and as the section 17 becomes saturated by the direct current being supplied to the load, the section 18 remains in an unsaturated condition. Up to this point the change in impedance of the alternating current windings of the reactor is being provided by the saturation of the core section 17, but when the section 17 becomes highly saturated, further increases in the direct current magnetization of section 17 no longer produce corresponding changes in the impedance of the windings. As this condition is approached, the increased magnetizing force begins to saturate the core section 18. The saturation of this core section results in a continued decrease in the impedance of the alternating current windings of the reactor and may be utilized to compensate for the voltage drop in the circuit under heavy load. Thus the reactor construction shown in Figure 2 provides independent compensation for light and heavy loads and makes it possible to control the load voltage at several points in the operating range. Where more flexibility of control is required, the core structure may be made in more sections or more than one reactor may be used. As previously stated, this structure may be used either with or without the non-linear resistor 29 in obtaining accurate regulation.

Figure 3:
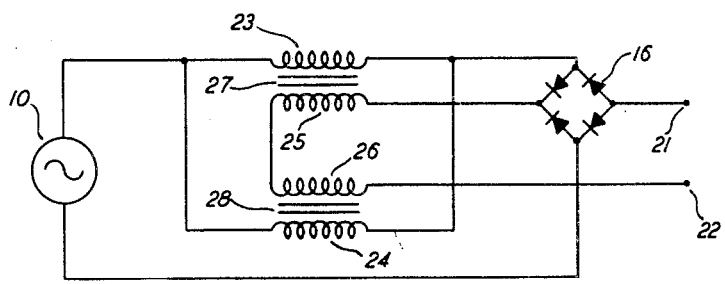
Figure 3 is a circuit similar to that shown in Figure 1 with the reactor and resistor of Figure 1 replaced by two individual transformers connected in parallel.

Figure 3 shows an arrangement in which two reactors 27 and 28 are used, having their alternating current windings 23 and 24 connected in parallel with each other and in series with the rectifier 16. The non-linear resistor 29 is not shown in Figure 3, as the two reactors can be made to produce the effect obtained with the core structure of Figure 2. The direct current windings 25 and 26 of the reactors are connected in series with each other and with the load circuit. The turn ratios of the reactors 27 and 28 are preferably made substantially alike so that they do not introduce alternating current into the direct current circuit. However, in order to obtain the optimum regulating characteristics under all conditions of load, the characteristics of these reactors with respect to direct current magnetization are preferably made substantially different from each other. This difference may be produced by varying several of the design constants of the reactors, particularly the number of turns of biasing winding per unit length of magnetic flux path. One of the reactors may be caused to saturate under low magnetizing forces and to provide the impedance change compensating for light loads on the rectifier while the other reactor may begin to saturate under heavier loads but may, nevertheless, have its impedance reduced to a very low value under heavy load currents. The combined impedance of the windings 23 and 24 in parallel therefore can be made to follow a curve determined largely by the characteristics of one reactor at light loads and the characteristics of the other reactor at heavy loads. This combination results in flexibility of control which makes possible the accurate compensation of the output voltage under both light and heavy currents.

It is not necessary to provide either of the reactors 27 and 28 with an air gap in its magnetic circuit or to utilize different core material for the two reactors, since the difference in characteristics can be produced by other design constants.

The non-linear resistor 29 shown in Figure 1 can also be used to advantage in the arrangement of Figure 3, although individual control of the impedance change at both light and heavy loads may be obtained without it in the manner described. In general, the various features shown or described may be utilized in various combinations other than those shown, in the practice of the principles of this invention.

Although this invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. A rectifying arrangement comprising a rectifier, saturable magnetic core means, alternating current winding means on the magnetic core means, first circuit means for connecting said rectifier in series with said alternating current winding means and a source of alternating current, direct current winding means on the magnetic core means adapted to vary the saturation of said core means to change the impedance of the alternating current winding means, second circuit means including said direct current winding means, adapted to change the impedance of the alternating current winding means in response to changes in the load delivered by the rectifier, and means for controlling the rate of change of said impedance with respect to load changes for both light and heavy load currents.

2. In combination, an alternating current supply circuit, a direct current load circuit, rectifying apparatus connecting said circuit, a regulating device responsive to the load of said load circuit for varying the impedance of said supply circuit, said regulating device comprising saturable magnetic core means, alternating current winding means thereon connected in said supply circuit, direct current winding means on the core means connected in said load circuit, and means controlling the relative responsiveness of said regulating means for light and heavy load currents, said means comprising a non-linear resistance in parallel with said direct current winding means and having a higher resistance to heavy load currents than to light load currents.

3. In combination, an alternating current supply circuit, a direct current load circuit, rectifying apparatus connecting said circuits, a regulating device responsive to the load of said load circuit for varying the impedance of said supply circuit, said regulating device comprising saturable magnetic core means, alternating current winding means thereon connected in said supply circuit, direct current winding means on the core means connected in said load circuit, and means controlling the relative responsiveness of said regulating means for light and heavy load currents, said means comprising a portion of the magnetic core means with magnetic characteristics different from those of the remainder of the core means.

4. In combination, an alternating current supply circuit, a direct current load circuit, rectifying apparatus connecting said circuits, a regulating device responsive to the load of said load circuit for varying the impedance of said supply circuit, said regulating device comprising saturable magnetic core means, alternating current winding means thereon connected in said supply circuit, direct current winding means on the core means connected in said load circuit, and means controlling the relative responsiveness of said regulating means for light and heavy load currents, said means comprising non-linear resistance means in said load circuit adapted with increasing load to increase the proportion of the load current in the load circuit which flows through said direct current winding means.

5. In combination, an alternating current supply circuit, a direct current load circuit, a rectifier connecting said circuits, a saturable magnetic core structure having a plurality of parallel flux paths of differing characteristics, alternating current winding means on the core structure and connected in series with the rectifier in the supply circuit, direct current winding means on the core structure, substantially non-inductively related to the alternating current winding means and adapted to magnetize the core structure, said direct current winding means being connected in said load circuit.

6. A rectifying arrangement comprising a rectifier adapted to be energized from an alternating current source through series inductance means comprising a plurality of saturable magnetic cores, with alternating current winding means and direct current winding means thereon, said alternating current winding means being connected in series with said rectifier and said source, said direct current winding means being adapted to be energized in proportion to the load current delivered by the rectifier and to magnetize said plurality of saturable magnetic cores to unequal flux densities to control the impedance of the alternating current winding means.

7. In combination, a rectifier and a control circuit, said control circuit being adapted to supply said rectifier with voltage increasing with increasing load, said control circuit comprising in combination, a direct-current controlled reactor controlled by a portion of the load current of the rectifier, and a non-linear resistor adapted to increase with increasing load the proportion of the load current which acts as a controlling current, said reactor being connected in series with said rectifier in its supply circuit.

GEORGE H. POHM.
HENRY M. HUGE.

REFERENCES CITED

The following references are of record in the file of this patent:

UNITED STATES PATENTS

| Number | Name | Date |
|---|---|---|
| 1,479,561 | Stoekle | Jan. 1, 1924 |
| 1,691,910 | Crouse et al. | Nov. 13, 1928 |
| 1,724,968 | Schelleng | Aug. 20, 1929 |
| 1,731,861 | McRell | Oct. 15, 1929 |
| 1,834,416 | Osgood | Dec. 1, 1931 |
| 1,839,869 | Davis | Jan. 5, 1932 |
| 2,015,534 | Rose | Sept. 24, 1935 |
| 2,025,093 | Cotter | Dec. 24, 1935 |
| 2,066,943 | Philpott | Jan. 5, 1937 |
| 2,102,713 | Jackson et al. | Dec. 21, 1937 |
| 2,157,977 | Alriq | May 9, 1939 |
| 2,309,156 | Andrews | Jan. 26, 1943 |
| 2,316,331 | Hedding | Apr. 13, 1943 |
| 2,329,537 | Huge | Sept. 14, 1943 |
| 2,383,722 | Haug | Aug. 28, 1945 |

FOREIGN PATENTS

| Number | Country | Date |
|---|---|---|
| 208,237 | Switzerland | Apr. 1, 1940 |